Patented Jan. 1, 1929.

1,696,923

UNITED STATES PATENT OFFICE.

IRA MARGIE PAUL, OF BROOKLYN, NEW YORK, ASSIGNOR TO METAL & THERMIT CORPORATION, OF CARTERET, NEW JERSEY, A CORPORATION OF NEW JERSEY.

PROCESS FOR RECOVERING VANADIUM.

No Drawing. Application filed August 12, 1926. Serial No. 128,913.

This invention relates to the recovery of vanadium; and it comprises a simple and direct method of extracting vanadium from complex ores, wherein the ore is mixed with hydrated alkali metal sulfid; the mixture melted in its water of crystallization and heated until the water is expelled; the melt leached; the leachings purified by an addition of an aluminum compound followed by partial acidification to precipitate phosphorous as aluminum phosphate enclosing and carrying down colloidal sulfur, and filtration; and the vanadium compounds directly precipitated from the filtrate, usually by an addition of an iron salt in the presence of an oxidizing agent; all as more fully hereinafter set forth and as claimed.

In the extracting of vanadium from complex ores containing the same, it is a desideratum to produce a pure vanadium product with the minimum of expense and manipulation. Many methods have been proposed and used for this purpose but they mostly involve complicated procedures or give impure products. Efficient extraction is hard to secure. Sometimes the ore is subjected to smelting treatments followed by wet treatments; sometimes the ore is extracted with acids and the solutions subjected to various precipitating operations. The marketable form in which the vanadium is regained, was formerly generally ammonium vanadate, but now it is more often ferric vanadate and/or vanadic oxide, materials which can be used in making other vanadium compounds or directly used in producing ferrovanadium. For this purpose, and generally for all metallurgical purposes, it is desirable to obtain a vanadium product, such as the ferric vanadate, vanadic oxide, etc., as free as may be of phosphorous and sulfur as well as certain other impurities. Natural ores containing vanadium usually contain not only phosphorous and sulfur but many other bodies in greater or less amount, such as molybdenum, lead, copper, antimony, iron, nickel, zinc, silica, etc.

Good extraction of vanadium can be obtained by an alkaline treatment of its ores, using caustic alkali, carbonated alkali or alkaline sulfids, either in the dry or the wet way; and many methods based on such reactions have been proposed, some being in use. Working with solutions under pressure has been proposed. Caustic and carbonated alkalis however not only extract vanadium, but bring into solution various undesirable bodies, notably phosphorous, silica, etc. Phosphorous has many analogies with vanadium and is difficult to separate therefrom with the completeness desirable for many purposes, and particularly where the final product is to be ferrovanadium. Alkaline sulfids give an excellent extraction and have the additional advantage of dissolving less other matter; most of the heavy metals remaining undissolved as heavy metal sulfids. Commercial alkali sulfids generally contain excess sulfur and this sulfur may be separated in the free form in the operations subsequent to the extraction. Where this is done, it goes down in colloidal form and is hard to separate. Free sulfur in the final product is as disadvantageous as phosphorous.

It is the object of the present invention to provide a method whereby I can extract vanadium from these ores in merchantable form by a low-temperature heating operation, leaching, purification and precipitation, without the necessity for the use of pressure or complicated apparatus. A simple open iron kettle or pan may be used for the heating operation. In my process, I react on the ore with hydrated alkali metal sulfids; mixing the ore and the sulfid and heating till the sulfid first melts in its water of hydration and then dries up. The melt is then leached and the leachings purified and vanadium recovered by precipitation.

Advantageously the ore is powdered to a fineness at least as great as 100 mesh (90 per cent through a 100 mesh sieve) and it may be much finer. No high temperature is required and the operation simply consists in mixing the ore and the sulfid and heating high enough to melt the hydrated material. Anhydrous commercial forms of alkaline sulfids may be used and in this event enough water is added to correspond roughly with the water of crystallization of the crystallized forms. The heating is continued until the mass dries up by loss of water. In so doing, there is good extraction of vanadium which is converted into a water soluble form, but relatively little silica goes into solution on subsequent leaching. Practically all the heavy metals other than vanadium are converted into insoluble forms. The extract formed on leaching is relatively pure, containing but little in solution other than vanadium; this vanadium being in the form of a compound with the sulfur and the alkali. The solution contains but little silica.

I have found that this solution can be effectively purified of phosphorus by an addition of a solution of aluminum sulfate or another aluminum compound. The aluminum sulfate is added in the proportion required to form aluminum phosphate from the phosphorus present as determined by analysis. Before or after the addition, the solution is acidified to the extent necessary to allow precipitation of the aluminum phosphate, but not to the extent where vanadium-sulfur compounds will likewise be thrown down. The precipitate should be white. The addition of acid results in the formation of $H_2S$ and more or less colloidal sulfur; but the surfur is enclosed and carried down by the gelatinous phosphate and does not go forward to contaminate the filtrate. The precipitate is readily filtered and washed, giving a filtrate containing vanadium in relatively pure form. From this filtrate vanadium can be recovered in any desired form by appropriate treatment; either as ammonium vanadate, calcium vanadate, vanadic oxide, ferric vanadate etc. Ordinarily, I make ferric vanadate, since not only is it a desirable market material but the solution made by the present method is well adapted for its production.

In operating according to the present invention, I heat finely powdered vanadium ore, which may be of any character but is usually a complex ore containing lead and zinc, etc. with commercial hydrated sodium sulfid. This may be the mono-sulfid or it may, and usually does, contain additional sulfur; that is, is a polysulfid. The crystallized sulfid and the ore may be directly mixed and then heated, or the sulfid may first be melted and then the ore stirred in. In either case, the mixture is kept stirred for a time at the temperature at which the sulfid melts in its water of crystallization. Heating and stirring are continued until the water of crystallization is driven off and a dry pulverulent product results. The whole operation may be conducted in an ordinary open iron kettle with a stirring device. The "melt" is cooled and leached with water. This brings the vanadium into solution as a soluble sulfur compound of sodium and vanadium, while most of the heavy metals present remain behind as insoluble sulfids. The leachings are a tolerably pure solution. To this solution I add a solution of a soluble aluminum compound such as alum or aluminum sulfate in amount equivalent to the $P_2O_5$ in solution as determined by analysis. I then add a little acid, which may be commercial hydrochloric acid or sulfuric acid, to reduce the alkalinity of the solution and permit deposition of a gelatinous precipitate of aluminum phosphate, together with the formation of colloidal sulfur. The precipitation is preferential and substantially no V is carried down with the P.

In making ferric vanadate, after filtration the liquid is treated with a soluble iron salt, such as ferrous sulfate, and is then oxidized in any convenient way to convert the vanadium compounds in solution into the pentavalent form ($V_2O_5$), this going down as insoluble ferric vanadate. Oxidation may be effected by bromin, blowing in chlorin, or by the use of chlorates, nitrates, etc., with sufficient acid to develop oxidation.

The insoluble ferric vanadate formed is collected by filtration, washed, dried and calcined. It is a commercial article and is saleable as such.

Other insoluble vanadium compounds may be formed by precipitation in lieu of ferric vanadate but, as stated, this compound is commercial and its formation in a pure state, moreover, from the solution given in the present process, is easy and economical.

The described method of freeing vanadium solution of phosphorus may be used with solutions made in other ways, as by heating a vanadium ore with caustic or carbonated alkali solution; but I regard it as best adapted for use with the relatively pure solutions given by extracting ore with alkaline sulfids. An in such use, it has the great additional advantage of disposing of free sulfur.

What I claim is:—

1. In the recovery of vanadium from its ores, the process which comprises heating such an ore in a finely divided state in admixture with a hydrated alkali metal sulfid till the latter first melts in its water of crystallization and then solidifies by loss of water.

2. In the recovery of vanadium from its ores, the process which comprises heating such an ore in a finely divided state in admixture with a hydrated alkali metal sulfid till the latter first melts in its water of crystallization and then dries up, cooling and leaching the melt; and adding to the leachings a solution of an aluminum salt in amount equivalent to the phosphorus present together with enough acid to form a gelatinous precipitate of aluminum phosphate.

3. In the removal of phosphorus from alkaline vanadium solutions made by leaching treated ore, the process which comprises adding a solution of an aluminum salt in amount equivalent to the phosphorus present and acidifying sufficiently to develop a precipitate of aluminum phosphate.

4. In the recovery of vanadium from its ores, the process which comprises heating such an ore in a finely divided state in the presence of a hydrated alkali metal sulfid till the latter first melts in its water of crystallization and then solidifies by loss of water, leaching the melt so formed, removing phosphorus and sulfur from the alkaline vanadium-containing solution and recovering vanadium from such solution by a precipitation in the presence of an oxidizing agent.

In testimony whereof I affix my signature.

IRA MARGIE PAUL.